United States Patent
Houzvicka et al.

(10) Patent No.: US 7,893,312 B2
(45) Date of Patent: Feb. 22, 2011

(54) $C_{7+}$ PARAFFIN ISOMERISATION PROCESS AND CATALYST THEREFORE

(75) Inventors: Jindrich Houzvicka, Turnov (CZ); Niels Jørgen Blom, Hillerød (DK)

(73) Assignee: Haldor Topsøe A/S, Lyngby (DK)

( * ) Notice: Subject to any disclaimer, the term of this patent is extended or adjusted under 35 U.S.C. 154(b) by 1793 days.

(21) Appl. No.: 10/663,647

(22) Filed: Sep. 17, 2003

(65) Prior Publication Data

US 2004/0059174 A1 Mar. 25, 2004

(30) Foreign Application Priority Data

Sep. 25, 2002 (DK) .............................. 2002 01414

(51) Int. Cl.
*C07C 5/13* (2006.01)

(52) U.S. Cl. .................................................... 585/751

(58) Field of Classification Search ................ 502/300, 502/305, 313, 323, 325, 327, 332, 333, 334, 502/339, 349; 585/734, 750, 751
See application file for complete search history.

(56) References Cited

U.S. PATENT DOCUMENTS

| | | | |
|---|---|---|---|
| 3,755,146 A | | 8/1973 | Smith et al. |
| 3,843,748 A | | 10/1974 | Ester et al. |
| 4,283,585 A | | 8/1981 | Legendre et al. |
| 4,956,519 A | * | 9/1990 | Hollstein et al. ............ 585/751 |
| 5,310,868 A | | 5/1994 | Angstadt et al. |
| 5,422,327 A | | 6/1995 | Soled et al. |
| 5,510,309 A | | 4/1996 | Chang et al. |
| 5,552,128 A | | 9/1996 | Santiesteban et al. |
| 5,648,589 A | | 7/1997 | Soled et al. |
| 5,780,382 A | | 7/1998 | Chang et al. |
| 5,837,641 A | | 11/1998 | Gosling et al. |
| 5,854,170 A | | 12/1998 | Chang et al. |
| 6,080,904 A | * | 6/2000 | Chang et al. ................ 585/751 |
| 6,326,328 B1 | | 12/2001 | Matsuzawa |
| 6,767,859 B2 | | 7/2004 | Ying et al. |

FOREIGN PATENT DOCUMENTS

| | | |
|---|---|---|
| EP | 0 408 318 A | 1/1991 |
| WO | WO 97/18892 A | 5/1997 |
| WO | WO 03/013722 A | 2/2003 |

OTHER PUBLICATIONS

J. C. Yori et al., Isomerization of n-Butane on Pt/SO42—ZrO2 and Mechanical Mixtures of Pt/Al2O3 + SO42—ZrO2, 153 J. Catal. 218-223 (1995).*
S. Zhang et al., Anion-Modified Zirconia: Effect of Metal Promotion and Hydrogen Reduction on Hydroisomerization of n-Hexadecane and Fischer-Tropsch Waxes, 69 Fuel Proc. Tech. 59-71 (2001).*
S. L. Soled, et al., "Comparison of Strong Solid Acids Based on Sulfate and Tungstate-Modified Zirconia", *Proc. 13th Int. Conf. Cat.*, (1994).
A. Calafat, "The Influence of Preparation Conditions on the Surface Area and Phase Formation of Zirconia", *Studies in Surface Science Catalysis*, vol. 118, (1998), pp. 837-843.
K. Arata et al., "Synthesis of Solid Superacid of Tungsten Oxide Supported on Zirconia And Its Catalytic Action", *Proceedings 9th International Congress on Catalysis*, (1988), pp. 1727-1726.
G. Larsen et al., "A Study of Platinum Supported on Tungstated Zirconia Catalysts", *Applied Catalysis*, pp. 201-211, (1996).
E. Iglesia et al., "Selective Isomerization of Alkanes on Supported Tungsten Oxide Acids", *Studies in Surface Science and Catalysis*, vol. 101, (1996), 533-542.

* cited by examiner

*Primary Examiner*—Glenn Caldarola
*Assistant Examiner*—Randy Boyer
(74) *Attorney, Agent, or Firm*—Dickstein Shapiro LLP

(57) ABSTRACT

There is provided a process for selective isomerisation of $C_{4+}$ paraffins using a catalyst comprising mixed aluminium, tungsten and zirconium oxides, and a hydrogenation/dehydrogenation component, such as palladium or other Group VIII metals. The feed may optionally also include shorter paraffins, aromatics or cycloparaffins.

5 Claims, 1 Drawing Sheet

C₇₊ PARAFFIN ISOMERISATION PROCESS AND CATALYST THEREFORE

BACKGROUND OF THE INVENTION

The present invention relates to a catalytic process for the production of high-octane gasoline from a hydrocarbon feed stream comprising $C_{4+}$ hydrocarbon cuts in presence of a catalyst composition comprising mixed aluminium and zirconium oxides modified with tungsten oxyanion and hydrogenation/dehydrogenation component of a Group VIII metal.

Multi-branched paraffins are ideal gasoline-blending components possessing high octane numbers. For environmental reasons, there is also a need to find substitutes for aromatic components in gasoline. Therefore, there is an incentive to develop a process for increasing the octane number of the $C_4$-$C_{12}$ cuts. While $C_5$/$C_6$ paraffin isomerisation is a common refinery process, commercialisation of processes including higher fractions ($C_{7+}$ hydrocarbons) meets significant difficulties given by the usually high degree of cracking to gas.

An article by K. Arata and M. Hino in Proceedings $9^{th}$ International Congress on Catalysis (1988) describes a catalyst based on a Group IVB metal oxide such as zirconia in particular, modified by the oxyanion of the Group VIB, particularly tungstate and its use in paraffin isomerisation.

U.S. Pat. No. 5,510,309 provided a method for preparing an acidic solid comprising a Group IVB metal oxide modified with an oxyanion of a Group VIB metal. An example of this acidic solid is zirconia modified with tungstate. This modified solid oxide may be used as a catalyst for example to isomerise $C_4$ to $C_8$ paraffins. The modified solid oxide is prepared by co-precipitating the Group IVB metal oxide along with the oxyanion of the Group VIB metal. Aluminium is mentioned merely as a conventional matrix material such as alumina, silica-alumina and silica with preference given to silica.

Use of tungstated zirconia promoted with noble metal in paraffin isomerisation was described in open literature—S. L. Soled, S. Miseo, J. E. Baumgartner, W. E. Gates, D. G. Barton and E. Iglesia, in: Proc. $13^{th}$ Int. Conf. Catal. (The Taniguchi Foundation, Kobe, Japan, 1994) page 17; E. Iglesia, D. G. Barton, S. L. Soled, S. Miseo, J. E. Baumgartner, W. E. Gates, G. A. Fuentes and G. D. Meitzner, Stud. Surf. Sci. Catal. 101 (1996) 533; G. Larsen, E. Lotero, S. Raghavan, R. D. Parra and C. A. Querini, Appl. Catal. A 139 (1996) 201.

The tungstated zirconia system was frequently described as catalyst for $C_{5+}$ isomerisation. The following patents are variations of the above-mentioned prior art. The catalyst typically contained tungsten oxide in a concentration below 20 wt % and hydrogenation component is platinum. Selectivity of these materials is not sufficient to reach liquid yields above 90% for $C_{7+}$ isomerisation when approaching composition given by thermodynamics. U.S. Pat. No. 5,422,327 describes a catalyst composition of a Group VIII metal incorporated into a support consisting of zirconia, said support being further impregnated with a mixture of silica and tungsten oxide and its use in paraffin isomerisation. U.S. Pat. No. 5,648,589 claims a catalytic isomerisation process comprising contacting a $C_{5+}$ feed under isomerisation conditions with a catalyst composition consisting of a Group VIII metal and a zirconia support impregnated with tungsten oxide and silica. U.S. Pat. No. 5,780,382 provides a method for preparing an acidic solid comprising a Group IVB metal oxide modified with an oxyanion of a Group VIB metal. U.S. Pat. No. 5,837,641 describes an isomerisation reaction over tungstated zirconia and the promotional effect of water on this catalyst. U.S. Pat. No. 6,080,904 describes a $C_4$-$C_8$ isomerisation process utilising an isomerisation catalyst with a hydrogenation/dehydrogenation component (preferentially Pt) and with solid acid component comprising a Group IVB metal oxide modified with an oxyanion of a Group VIB metal.

DETAILED DESCRIPTION OF THE INVENTION

Figure 1:
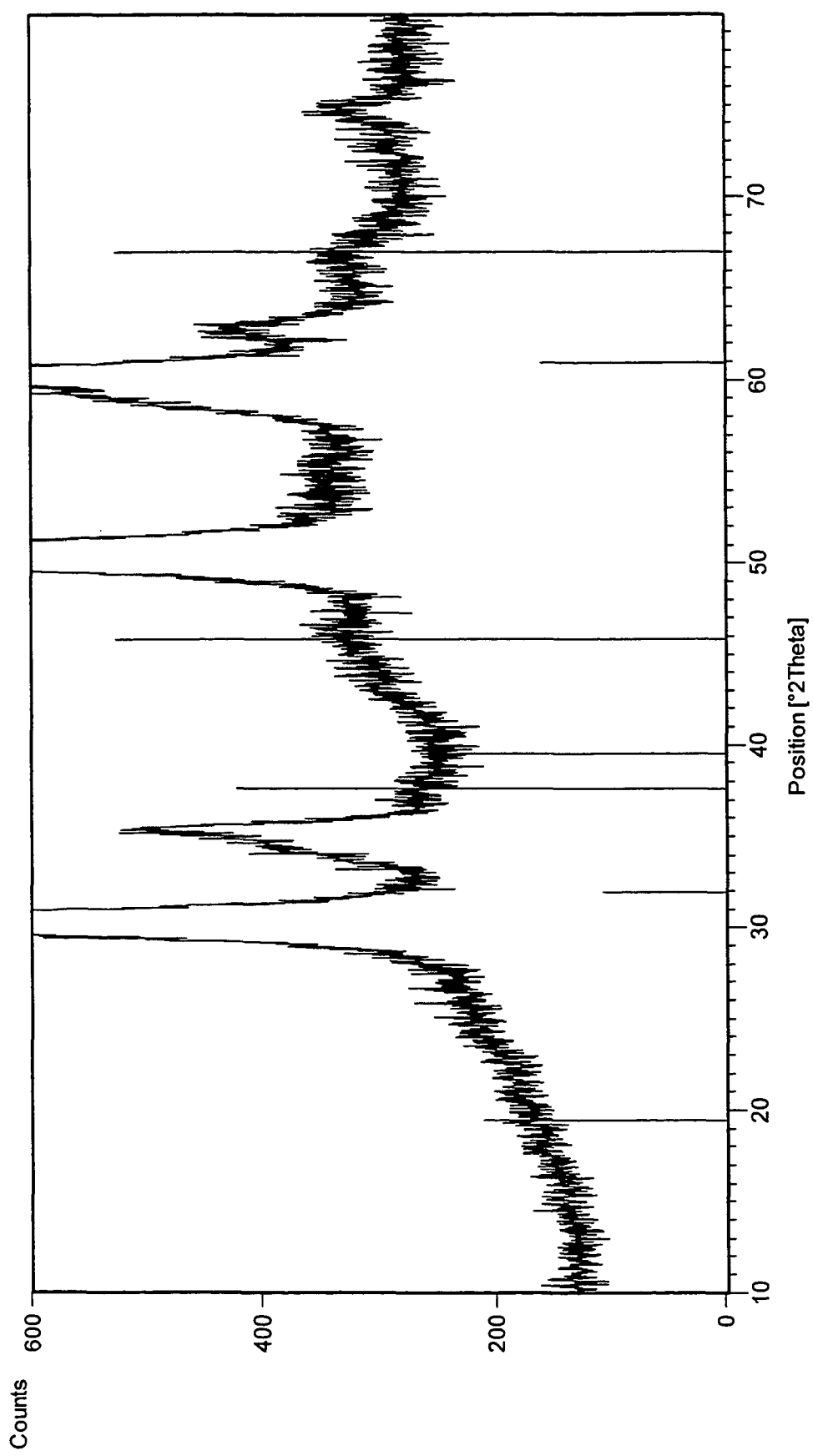
FIG. 1 shows a spectrogram from x-ray analysis of a catalyst according to one embodiment of the invention.

The general object of the invention is to provide a process for improving the octane number of a $C_{4+}$ hydrocarbon mixture through isomerisation without substantial cracking of the produced multi-branched hydrocarbons. Multi-branched isomers are in this case defined as compounds containing more than one carbon atom having bond to at least three other neighbouring carbon atoms or containing at least one carbon atom having bond to four neighbouring carbon atoms. Mono-branched isomers are defined as compounds containing just one carbon atom with bonds to three neighbouring carbon atoms. The process can be designed solely for the $C_{7+}$ fraction or cuts containing this fraction (e.g. $C_4$-$C_7$, $C_5$-$C_9$, $C_7$-$C_9$, $C_6$-$C_7$, $C_7$, $C_8$ or $C_9$, $C_9$-$C_{12}$) and consisting mainly of paraffins and possibly naphtenes, aromates and olefins.

The main embodiment of the invention is a combination of three oxides and their use in catalytic production of multi-branched $C_{7+}$ isomers. The catalyst comprises zirconia, alumina and tungsten oxide, which are calcined and reacted together at high temperature and impregnated with a Group VIII metal. A catalyst composition comprising a Group VIII metal on mixed oxides behaves differently from noble metal supported on tungstated zirconia or on alumina only. The catalyst composition described by this invention provides a very efficient and mechanically strong catalyst, which reaches high selectivity in $C_{7+}$ isomerisation.

Isomerisation proceeds on Brønsted acid sites and acidity originates from the reaction between tungsten oxide and zirconia. The references (for example E. Iglesia, D. G. Barton, S. L. Soled, S. Miseo, J. E. Baumgartner, W. E. Gates, G. A. Fuentes and G. D. Meitzner, Stud. Surf. Sci. Catal. 101 (1996) 533) disclose that "high isomerisation rates occur on samples with near saturation W surface densities". Such saturation typically occurs at around 15 wt % of tungsten loading. However, as a part of this invention it is shown that excess of tungsten oxide much above formation of tungsten oxide mono-layer on zirconia support has a very positive effect on the selectivity of the catalyst. Unlike claimed in most of the references for $C_{5+}$ isomerisation, the optimum for $C_{7+}$ isomerisation catalyst is in the range of 10% to 50%, most preferentially 20% to 40%. Excess of tungsten oxides might have a positive effect on the concentration of hydrogen on the catalyst surface and therefore on hydrogen transfer and desorption of isomerisation intermediates before their cracking to gas.

The role of alumina in the catalyst is twofold. Primarily, addition of alumina significantly increases selectivity towards multi-branched isomers. The most striking effect is on the rate of formation of isomers with quaternary carbon atoms like 2,2-dimethylpentane. These isomers posses very high octane numbers and are difficult to form via classical carbenium ion mechanism on conventional isomerisation catalysts like sulphated zirconia, chlorinated alumina, heteropoly acids, zeolites etc., or on alumina free tungstated zirconia with low tungsten content. Secondary, alumina improves the mechanical strength of the catalyst. The preparation of mechanically stable sulphated zirconia catalyst by addition of alumina is described in several patents for example in U.S. Pat. No. 6,326,328. For the catalyst of this invention, an alumina content of at least 10 wt % is required to achieve sufficient strength. The most preferred catalyst contains between 10% and 50 wt % of alumina.

The quality of the applied zirconia is very important for the total catalyst performance. Zirconia can be prepared, for example, by precipitation of zirconyl nitrate or zirconyl chloride with ammonia at high pH followed by heating under reflux, similarly to A. Calafat, Stud. Surf. Sci. Catal. 118 (1998) 837. The zirconia used for the preparation of the invented catalyst was dried at 120° C. and possessed a surface area above 300 m$^2$/g.

The most typical tungsten precursor is ammonium metatungstate due to its high solubility and low price, while the most typical aluminium source would be hydrated aluminas, like pseudoboehmite. However, since the origin of these compounds plays a rather inferior role for the catalyst's quality, the list is not limited to the above mentioned materials.

The Group VIII metal may be selected from any of the Group VIII metals and mixtures thereof. The preferred metals are palladium and platinum with a concentration between 0.01 wt % to 5 wt %, most preferentially between 0.05 wt % to 1 wt %.

Besides the above mentioned strictly required catalyst components, boron and phosphorous compounds are also known to stabilise zirconia in the tetragonal form, which is the main support for acidic active sites. Therefore, these compounds might also be added with a loading of up to 20 wt % of the dry catalyst.

The manufacturing procedure of mechanically strong catalyst extrudates is commonly applied for and known by those skilled in the art. It comprises the following steps:
(a) Kneading of the mixture of zirconium and aluminium oxides/hydroxides and tungsten precursor.
(b) Shaping the kneaded mixture.
(c) Calcining the mixture at 600-900° C., most preferentially at 650° C.-800° C.
(d) Impregnation of the catalyst with the Group VIII metal.
(e) Calcination of the resulting material at 300-800° C., most preferentially between 300° C. to 500° C.

This standard procedure can as a matter of course be modified. For example, mixed alumina and zirconia can be prepared by the co-precipitation of both precursors with ammonia, the tungsten precursor can be added after the alumina-zirconia extrudates have been made and calcined, Group VIII metal can be added already before the first calcination step, etc.

The $C_{4+}$ isomerisation reaction on the above mentioned catalyst proceeds in the presence of hydrogen with a hydrogen to hydrocarbon molar ratio between 0.1 to 5. Typical operating conditions are temperatures between 150° C. to 300° C., total pressures varying between 1 and 40 bar and liquid space velocities (LHSV) between 0.1 to 30 h$^{-1}$. The preferred conditions are temperatures between 130-250° C., LHSV=0.5-5 h$^{-1}$, pressures between 5-15 bar and a hydrogen:hydrocarbon ratio between 1 and 3. The feed may optionally also include shorter paraffins, aromatics or cycloparaffins. When passing such a feed through the reactor bed, shorter paraffins are also isomerised, while equilibrium is established between aromatics and corresponding cycloalkanes. At typical reaction temperatures, the equilibrium is shifted towards cycloalkanes. The reaction rate for ring opening will be very slow.

Specific embodiments of the invention for the production of a high liquid yield of gasoline with a high research octane number (RON) are described in more detail below.

EXAMPLE 1

Zirconium oxide was prepared by adding diluted ammonia water to an aqueous solution of zirconyl nitrate and adjusting pH to 9. The mixture was refluxed overnight. The white solid was filtered and washed and dried overnight at 120° C. The dried material had a surface area of 333 m$^2$/g. 225 g of zirconia, 168 g alumina gel (pseudoboehmite 30 wt %) and 62 g of ammonium metatungstate were mixed for 15 minutes and extruded into 1/16" extrudates. The catalyst was calcined at 700° C. for three hours. XRD of the calcined catalyst demonstrate the presence of alumina as shown in FIG. 1. 0.5 wt % Pd was introduced by incipient wetness impregnation. The catalyst was calcined at 350° C. before it was placed into the reactor.

EXAMPLE 2

Comparative Example

Zirconium oxide was prepared by adding diluted ammonia water to an aqueous solution of zirconyl nitrate and adjusting pH to 9. The mixture was refluxed overnight. The white solid was filtered and washed and dried overnight at 120° C. The dried material had a surface area of 333 m$^2$/g. 225 g of zirconia and 62 g of ammonium metatungstate was mixed with an sufficient amount of water to form an extrudable paste. This paste was mixed for 15 minutes and extruded into 1/16" extrudates. The catalyst was calcined at 700° C. for three hours and 0.5 wt % Pd was introduced by incipient wetness impregnation. The catalyst was calcined at 350° C. before it was placed into the reactor.

EXAMPLE 3

Zirconium oxide was prepared by adding diluted ammonia water to an aqueous solution of zirconyl nitrate and adjusting pH to 9. The mixture was refluxed overnight. The white solid was filtered and washed and dried overnight at 120° C. The dried material had a surface area of 333 m$^2$/g. 225 g of zirconia, 168 g alumina gel (pseudoboehmite 30 wt %) and 62 g of ammonium metatungstate were mixed for 15 minutes and extruded into 1/16" extrudates. The catalyst was calcined at 700° C. for three hours. 0.5 wt % Pt was introduced by incipient wetness impregnation. The catalyst was calcined at 350° C. before it was placed into the reactor.

EXAMPLE 4

Heptane isomerisation with the catalyst prepared according to Example 1 was performed in a fixed bed reactor at 190° C. with LHSV=1 h$^{-1}$ at a total pressure of 7 bar and the feed consisting of a hydrogen:hydrocarbon mixture with the ratio of 1:2. A detailed description of the product composition is shown in Table 1.

Based on a once-through mode, multi-branched isomers yielded 30% with only 3.1% cracking (liquid yield 91%). Calculated RON of the multi-branched isomer fraction is 88.8.

TABLE 1 n-Heptane isomerisation at 190° C. with LHSV = 1 h$^{-1}$ at
a total pressure of 7 bar and the feed consisting of
a hydrogen:hydrocarbon mixture of a ratio of 1:2.

|  | Product [wt %] |
|---|---|
| Propane | 1.32 |
| Isobutane | 1.70 |
| n-Butane | 0.09 |
| Isopentane | 0.03 |
| Isohexanes | 0.03 |
| 2,2-dimethylpentane | 9.20 |
| 2,4-dimethylpentane | 7.68 |
| 2,2,3-trimethylbutane | 1.07 |
| 3,3-dimethylpentane | 4.33 |
| 2-methylhexane | 26.08 |
| 2,3-dimethylpentane | 7.68 |
| 3-methylhexane | 24.66 |
| 3-ethylpentane | 1.69 |
| n-heptane | 14.21 |
| Cycloheptanes | 0.10 |

EXAMPLE 5

Comparative Example

Heptane isomerisation with the catalyst prepared according to Example 2 was performed in a fixed bed reactor at 190° C. with LHSV=1 h$^{-1}$ at a total pressure of 7 bar and the feed consisting of a hydrogen:hydrocarbon mixture with the ratio of 1:2. A detailed description of the product composition is shown in Table 2.

Based on a once-through mode, multi-branched isomers yielded 25.3% with 7.8% cracking (liquid yield 69%). Calculated RON of the multi-branched isomer fraction is 88.9.

TABLE 2 n-Heptane isomerisation at 190° C. with LHSV = 1 h$^{-1}$ at
a total pressure of 7 bar and the feed consisting of
a hydrogen:hydrocarbon mixture of a ratio of 1:2.

|  | Product [wt %] |
|---|---|
| Propane | 3.31 |
| Isobutane | 4.25 |
| n-Butane | 0.12 |
| Isopentane | 0.05 |
| Isohexanes | 0.07 |
| 2,2-dimethylpentane | 7.48 |
| 2,4-dimethylpentane | 6.54 |
| 2,2,3-trimethylbutane | 0.81 |
| 3,3-dimethylpentane | 3.08 |
| 2-methylhexane | 24.21 |
| 2,3-dimethylpentane | 7.35 |
| 3-methylhexane | 23.97 |
| 3-ethylpentane | 1.67 |
| n-heptane | 16.85 |
| Cycloheptanes | 0.15 |

The results in Example 4 and Example 5 demonstrate that the catalyst of the invention exhibits higher yield of multi-branched isomers and significantly lower cracking activity.

EXAMPLE 6

Heptane isomerisation with the catalyst prepared according to Example 1 was performed in a fixed bed reactor at 165° C. with LHSV=0.2 h$^{-1}$ at a total pressure of 6 bar and the feed consisting of a hydrogen:hydrocarbon mixture with the ratio of 1:2. A detailed description of the product composition is shown in Table 3.

The catalyst produced on a once-through basis 35.1% of multi-branched isomers with only 3.2% cracking (liquid yield 92%). Calculated RON of the multi-branched isomer fraction is 89.2.

TABLE 3 n-Heptane isomerisation at 165° C. with LHSV = 0.2 h$^{-1}$
at a total pressure of 7 bar and the feed consisting
of a hydrogen:hydrocarbon mixture of a ratio of 1:2.

|  | Product [wt %] |
|---|---|
| Propane | 1.34 |
| Isobutane | 1.74 |
| n-Butane | 0.07 |
| Isopentane | 0.03 |
| Isohexanes | 0.03 |
| 2,2-dimethylpentane | 11.66 |
| 2,4-dimethylpentane | 9.02 |
| 2,2,3-trimethylbutane | 1.22 |
| 3,3-dimethylpentane | 4.84 |
| 2-methylhexane | 25.52 |
| 2,3-dimethylpentane | 8.32 |
| 3-methylhexane | 23.2 |
| 3-ethylpentane | 1.49 |
| n-heptane | 11.30 |
| Cycloheptanes | 0.10 |

EXAMPLE 7

A sample of a catalyst according to Example 1 was analysed by x-ray diffraction.

The result was printed out as a spectrogram shown on FIG. 1.

The x-axis is the 2 θ range at which the analysis was performed. At 32°, 37.5°, 39.5°, 46°, 61° and 67° peaks occur proving the presence of eta-alumina.

This clearly indicates that aluminium is present as alumina in the structure of the active part of the catalyst.

The invention claimed is:

1. A process for the production of high-octane gasoline from a hydrocarbon feed stream with $C_{4+}$ hydrocarbons cuts comprising contacting the feed under isomerisation conditions with a catalyst composition consisting of mixed aluminium and zirconium oxides modified with tungsten oxyanion and platinum and/or palladium.

2. A process according to claim 1, wherein the hydrocarbon feed contains at least 20 wt % of $C_{7+}$ hydrocarbons.

3. A process according to claim 1, wherein the isomerisation conditions comprise presence of hydrogen with a hydrogen to hydrocarbon molar ratio between 0.1 to 5, a temperature range from 150° C. to 300° C., a total pressure of between 1 and 40 bar and a liquid space velocity LHSV of between 0.1 to 30 h$^{-1}$.

4. A process according to claim 1, wherein the catalyst composition in its dry form comprises 10-50 wt % of tungsten oxide, 10-40% of aluminium oxide and a remainder of zirconia and Group VIII metal.

5. A process according to claim 1, wherein the platinum and/or palladium is in an amount of between 0.01 wt % to 5 wt %.

* * * * *